(12) United States Patent
Fry

(10) Patent No.: US 12,046,383 B2
(45) Date of Patent: Jul. 23, 2024

(54) MAGNETIC COUPLING FOR RADIATION SHIELDING

(71) Applicant: Byron Douglas Fry, Highlands Ranch, CO (US)

(72) Inventor: Byron Douglas Fry, Highlands Ranch, CO (US)

(73) Assignee: Byron Douglas Fry, Highlands Ranch, CO (US)

( * ) Notice: Subject to any disclaimer, the term of this patent is extended or adjusted under 35 U.S.C. 154(b) by 382 days.

(21) Appl. No.: 17/647,675

(22) Filed: Jan. 11, 2022

(65) Prior Publication Data

US 2023/0223163 A1 Jul. 13, 2023

(51) Int. Cl.
*G21F 3/00* (2006.01)
*F16B 1/00* (2006.01)

(52) U.S. Cl.
CPC ............... *G21F 3/00* (2013.01); *F16B 1/00* (2013.01); *F16B 2200/83* (2023.08)

(58) Field of Classification Search
CPC ............ G21F 3/00; F16B 1/00; F16B 2200/83
USPC ....................................................... 250/517.1
See application file for complete search history.

(56) References Cited

U.S. PATENT DOCUMENTS

| | | | |
|---|---|---|---|
| 2005/0222646 A1* | 10/2005 | Kroll ..................... | A61N 1/326 607/72 |
| 2022/0020516 A1* | 1/2022 | Yu ........................ | G01R 33/3804 |

\* cited by examiner

*Primary Examiner* — Kiet T Nguyen

(57) ABSTRACT

A radiation shielding device comprising of radiation shielding material and a switchable magnet device that is at least partially disposed within the radiation shielding material. The switchable magnet device may include a plurality of permanent magnets and an actuator that adjusts an orientation of at least one of the polarities of permanent magnets to switch the switchable magnet device between an on configuration in which the switchable magnet device produces a net attractive force and an off configuration in which the switchable magnet device produces substantially reduced magnetic force.

10 Claims, 6 Drawing Sheets

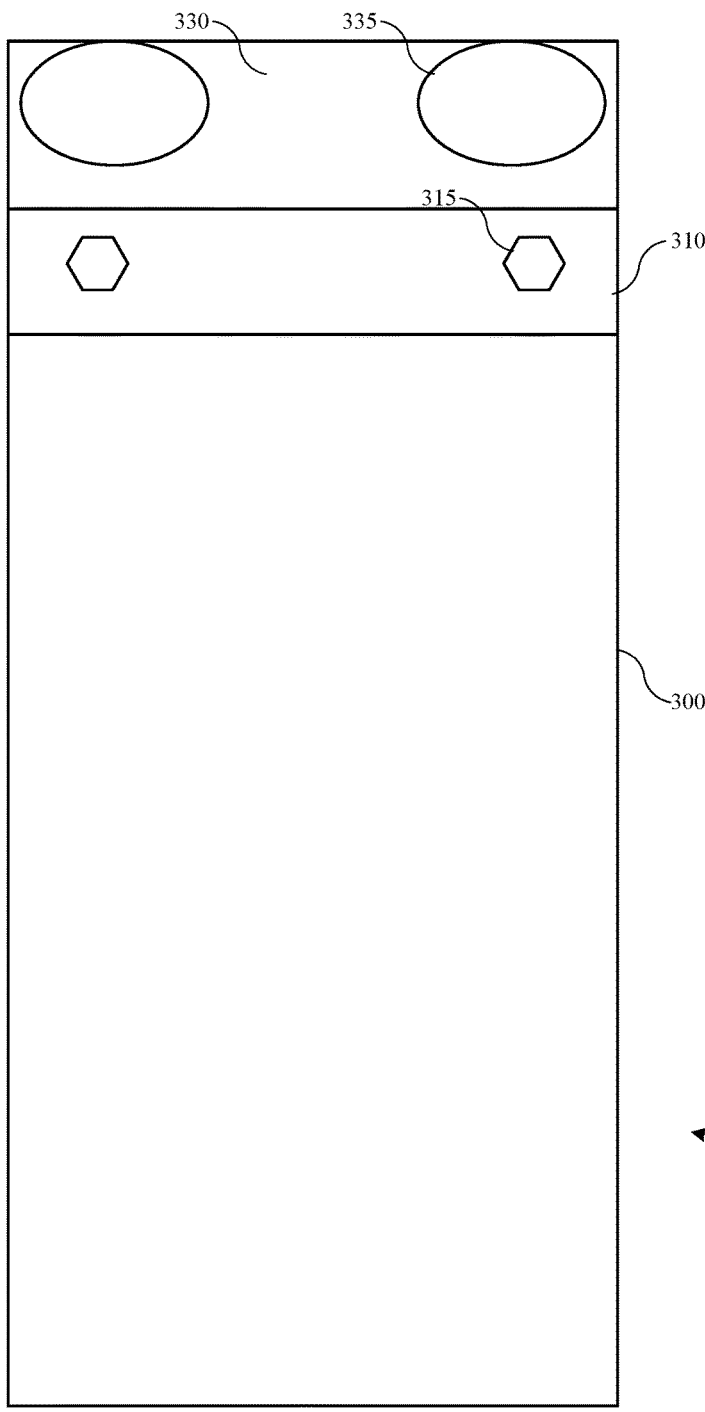
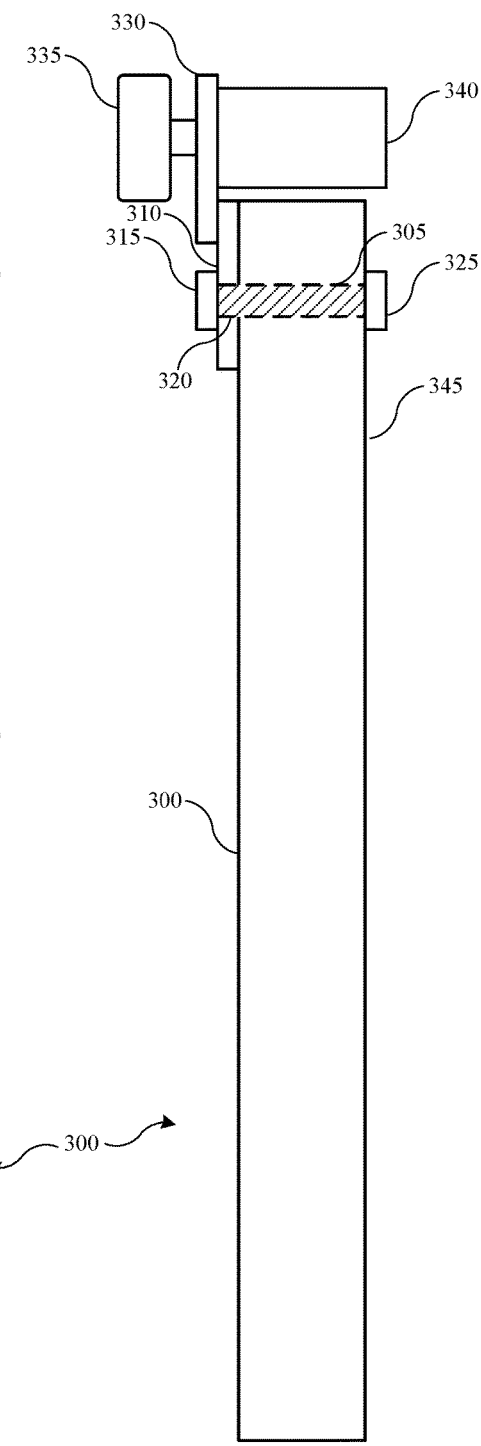
*FIG. 9A*        *FIG. 9B*

MAGNETIC COUPLING FOR RADIATION SHIELDING

BACKGROUND OF THE INVENTION

Environments that contain radioactive materials and/or equipment that needs to be shielded, such as nuclear power plants and nuclear submarines, may have space limitations that prohibit installation or construction of specialized scaffolding to support the necessary radiation shielding. Oftentimes, the radiation shielding in such environments is therefore suspended on pipes or other existing structures using s-hooks that are inserted through grommet holes formed in the radiation shielding. In other cases, radiation shielding may incorporate magnets that are embedded within the shielding material. However, due to the heavy weight of the shielding, the magnets must be very strong to support the weight of the shielding, which makes it difficult to remove the shielding from a structure if repositioning or replacement of the shielding is necessary. Additionally, elastomers used to form the radiation shielding may degrade at areas proximate the magnets, which may result in the magnets pulling out of the radiation shield material. Other embodiments may incorporate ferrous powder into the material (polymer) forming the radiation shield, which may then be run through a magnetizer to magnetize small portions of the radiation shields. However, such radiation shields typically do not provide sufficient attractive force to hold the radiation shields in place in the event of outside forces, such as seismic forces. Therefore, improvements in the area of radiation shielding are desired.

BRIEF SUMMARY OF THE INVENTION

Embodiments of the present invention are directed to radiation shield devices that provide increased attachment strength to secure the radiation shield devices to equipment and/or other structures. To secure the radiation shield devices, embodiments of the present technology utilize magnetic devices that can be switched on and off, allowing the radiation shield devices to be easily removed for decontamination, replacement, repositioning, and/or other purposes.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a set of parentheses containing a second label that distinguishes among the similar components. If only the first reference label is used in the specification, the description is applicable to any one of the similar components having the same first reference label irrespective of the second reference label.

FIG. 9A illustrates a top plan view of a retrofit radiation shielding device according to embodiments of the present invention.

FIG. 9B illustrates a cross-sectional side elevation view of the retrofit radiation shielding device of FIG. 9A.

DETAILED DESCRIPTION OF THE INVENTION

Figure 1:
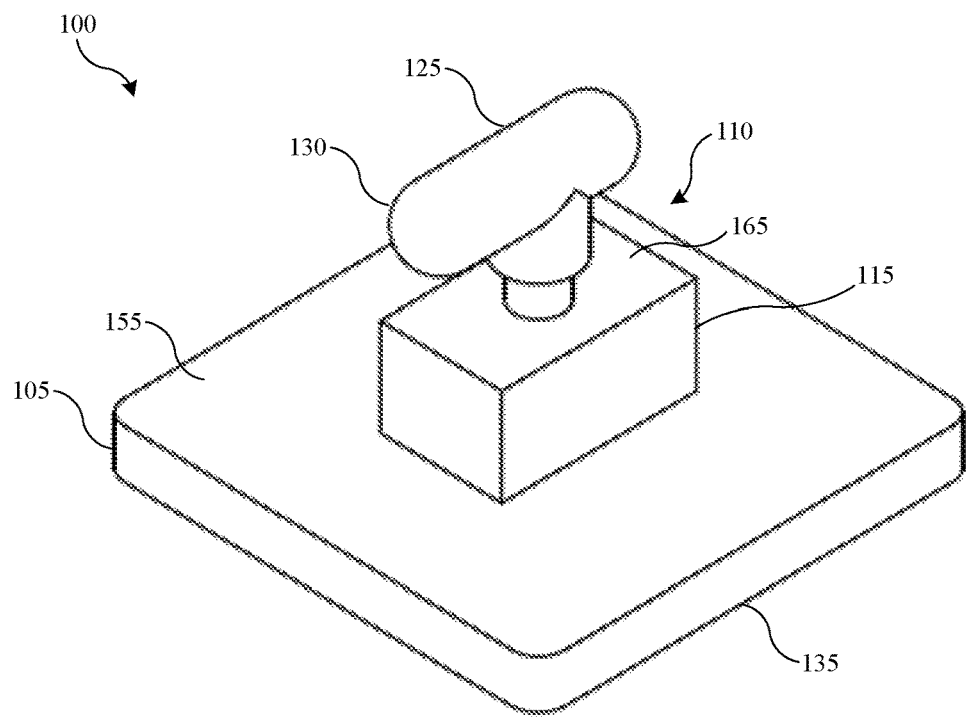
FIG. 1 illustrates an isometric view of a radiation shielding device according to embodiments of the present invention.
Figure 2:
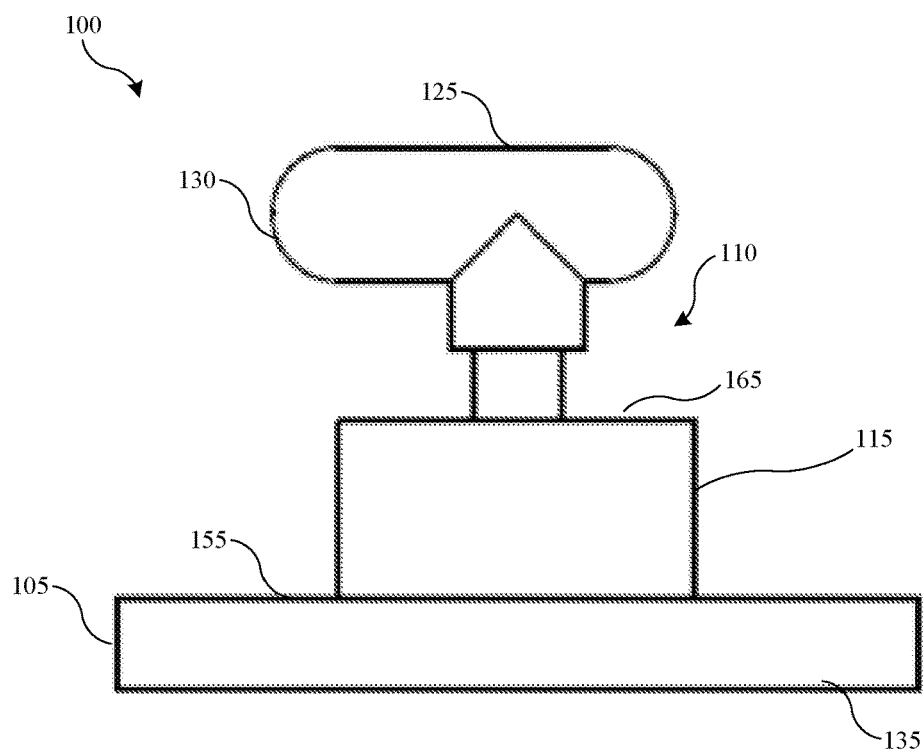
FIG. 2 illustrates a first side elevation view of the radiation shielding device of FIG. 1.
Figure 3:
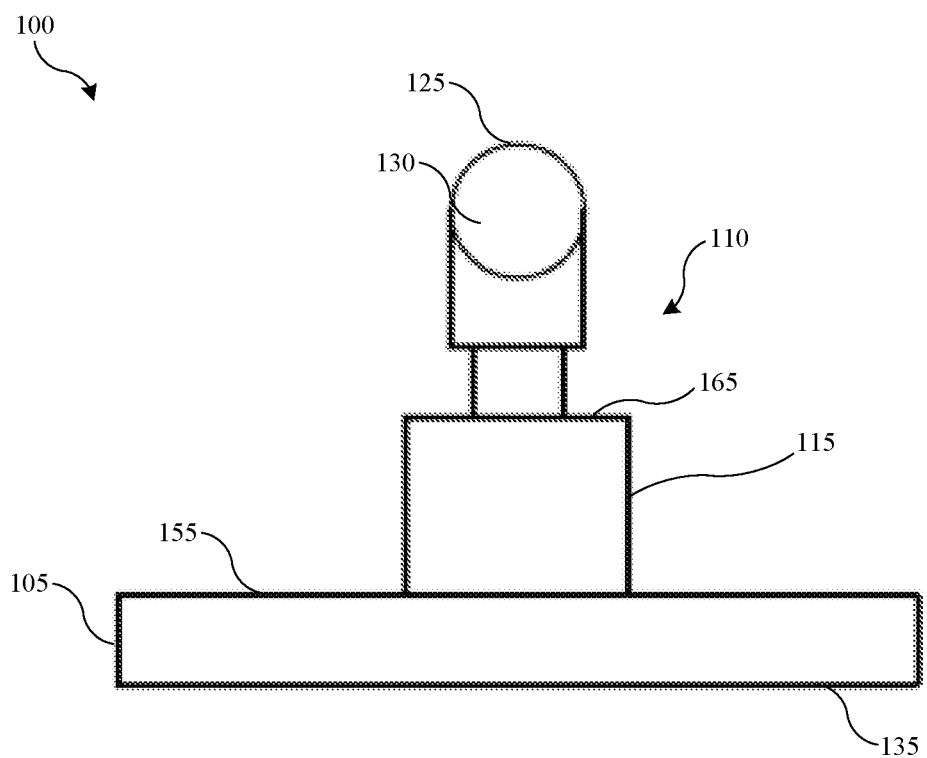
FIG. 3 illustrates a second side elevation view of the radiation shielding device of FIG. 1.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the present invention are directed to radiation shielding devices that may be removably secured to equipment and/or other mounting structures through the use of magnets. In particular, embodiments may integrate switchable magnet devices into radiation shielding that allow the shielding to be secured to the equipment and/or easily removed for repositioning, replacement, and/or other purposes. Embodiments of the invention may provide stronger magnetic force than conventional magnetically attached radiation blankets, while also enabling the radiation shielding to be easily removed. Additionally, embodiments of the present invention are directed to systems and methods of retrofitting existing radiation shield blankets to include switchable magnet devices.

Turning now to FIGS. 1-7, one embodiment of a radiation shielding device 100 is illustrated. The radiation shielding device 100 may include a radiation shielding material layer 105 and a switchable magnet device 110 that is at least partially disposed within the radiation shielding material layer 105. The radiation shielding material layer 105 may be formed from a combination of one or more elastomers (such as addition cure elastomers, condensation cure elastomers, heat cured elastomers, and the like), one or more heavy metals (such as tungsten, bismuth, lead, etc.), and/or one or more fillers. Suitable elastomers may include, without limitations, silicone rubber, butyl rubber, etc. While shown as a generally square tile, the radiation shielding material layer 105 may have any size and/or shape, including rectangular, circular, triangular, and the like. For example, embodiments of radiation shielding material layer 105 may range from relatively small tiles that have areas of less than about 1 ft$^2$ or smaller and blankets that have length and width dimensions exceeding 1 ft. Oftentimes, the radiation shielding device 100 may have a total weight of less than about 75 lbs., however, heavier radiation shielding device 100 may be used in some embodiments. While illustrated with radiation shielding device 100 having a single switchable magnet device 110 centered within the radiation shielding material layer 105, it will be appreciated that multiple switchable magnet devices 110 may be included on a single radiation shielding device 100. The switchable magnet devices 110 may be positioned about the area of the radiation shielding material layer 105 in any arrangement. The use of multiple switchable magnet devices 110 may be particularly beneficial in embodiments with larger and/or heavier radiation shielding materials 105, as the additional switchable magnet devices 110 may help support the greater weight of a heavier radiation shielding device 100.

The switchable magnet device 110 may include a body 115 that houses a number of permanent magnets, which in some embodiments may be neodymium magnets. At least some of the permanent magnets may be rotatably arranged within the body 115 such that rotation of the permanent magnets between a first configuration and a second configuration changes the net magnetic force exhibited by the switchable magnet device 110 in an axial direction along a longitudinal axis of the switchable magnet device 110 (which may be defined as the axis that extends through a thickness of the radiation shielding material layer 105). For example, rotation of at least some of the permanent magnets may switch the switchable magnet device 110 between an "on" configuration in which the switchable magnet device produces a net attractive force and an "off" configuration in which the switchable magnet device 110 produces substantially zero net magnetic force. As just one example, the switchable magnet device 110 may include two disc magnets that are coaxial with one another along the longitudinal axis of the switchable magnet device 110. Each disc magnet may have opposing poles arranged on opposite semicircular portions of the disc magnet. In the on configuration, the north poles of each of the disc magnets may be aligned with one another and the south poles of each of the disc magnets may be aligned with one another, which causes the switchable magnet device 110 to exhibit a net attractive force along the longitudinal axis. This net attractive force may be usable to secure the switchable magnet device 110 to various metallic objects at a distal end 120 (shown in FIG. 4) of the body 115 of the switchable magnet device 110. In the off configuration, the north pole of each of the disc magnet may be aligned with the south pole of the other disc magnet, which causes the switchable magnet device 110 to exhibit a reduced net force along the longitudinal axis, which allows the switchable magnet device 110 to be easily removed from a metallic structure.

The magnets of the switchable magnet device 110 may be selected to have sufficient force to hold the radiation shielding device 100 in place. For example, each switchable magnetic device 110 may provide an attractive force of at least 60 lbs., at least 90 lbs., at least 150 lbs., or more when in the on configuration to meet the needs of a particular application. As indicated above, multiple switchable magnet devices 100 may be included on a single radiation shielding device 100. In such embodiments, a number and/or arrangement of switchable magnet devices 100 may be based on a total weight of the radiation shielding device 100, a shape of the radiation shielding device 100, and/or a net attractive force of each switchable magnetic device 110 being used.

The switchable magnet device 110 may include an actuator that controls switching of the switchable magnet device 110 between the on configuration and the off configuration. For example, the switchable magnet device 110 may include a graspable knob 125 that is usable to rotate one or more of the permanent magnets to change the configuration of the switchable magnet device 110. The knob 125 may include one or more prongs or arms 130 that extend outward from a center of the knob 125 to help a user grasp and manipulate the knob 125, even if the user is wearing thick work gloves. The knob 125 may be formed from a strong, rigid material, such as molded plastic and/or metal. In some embodiments, the knob 125 may be formed from a corrosion resistant material, such as stainless steel, that may be sanitized and/or decontaminated without degradation of the knob 125. The knob 125 may extend through a proximal end 165 of the body 115 of the switchable magnet device 110 and may couple with at least one of the permanent magnets such that rotation of the knob 125 causes one or more of the permanent magnets to rotate or otherwise change orientation to switch the net magnetic force along the longitudinal axis of the switchable magnet device 110 between the on and off configurations. It will be appreciated that while shown with a knob 125, other actuation devices may be used to switch the configuration of the switchable magnet device 110.

Figure 4:
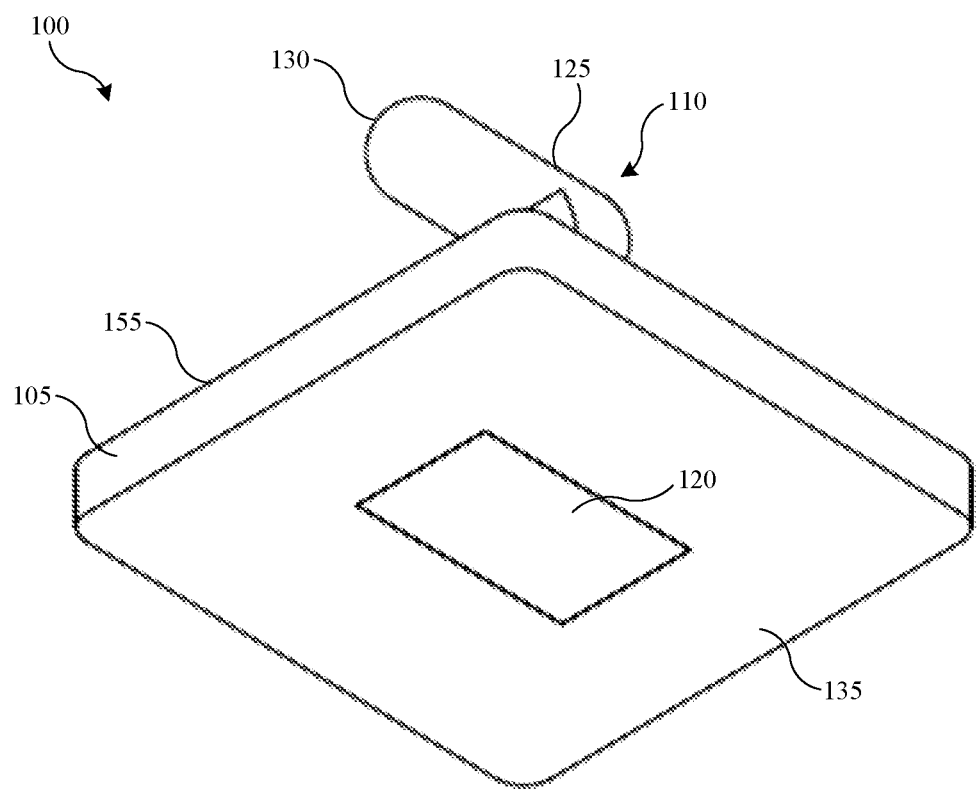
FIG. 4 illustrates a bottom isometric view of the radiation shielding device of FIG. 1.

The body 115 of the switchable magnet device 110 may extend fully or partially through a thickness of the radiation shielding material layer 105. For example, in some embodiments, the distal end 120 of the body 115 of the switchable magnet device 110 may be exposed through a bottom surface 135 of the radiation shielding material layer 105. In some such embodiments, the distal end 120 may be substantially flush with the bottom surface 135 of the radiation shielding material layer 105 such as illustrated in FIG. 4. In other embodiments the distal end 120 may extend beyond the bottom surface 135 and/or be offset from the bottom surface 135 within a thickness of the radiation shielding material layer 105. Embodiments in which the distal end 120 is exposed through the bottom surface 135 may be particularly beneficial as the direct contact between the distal end 120 of the switchable magnet device 110 and a metallic equipment or structure surface may enable a stronger magnetic attraction to occur. In some embodiments, the distal end 120 may extend only partially through a thickness of the radiation shielding material layer 105, with the bottom surface 135 of the radiation shielding material layer 105 covering the distal end 120. Such embodiments may be particularly useful in making the radiation shielding device 100 easier to sanitize and/or decontaminate, however may necessitate the use of additional and/or stronger magnets.

Figure 5:
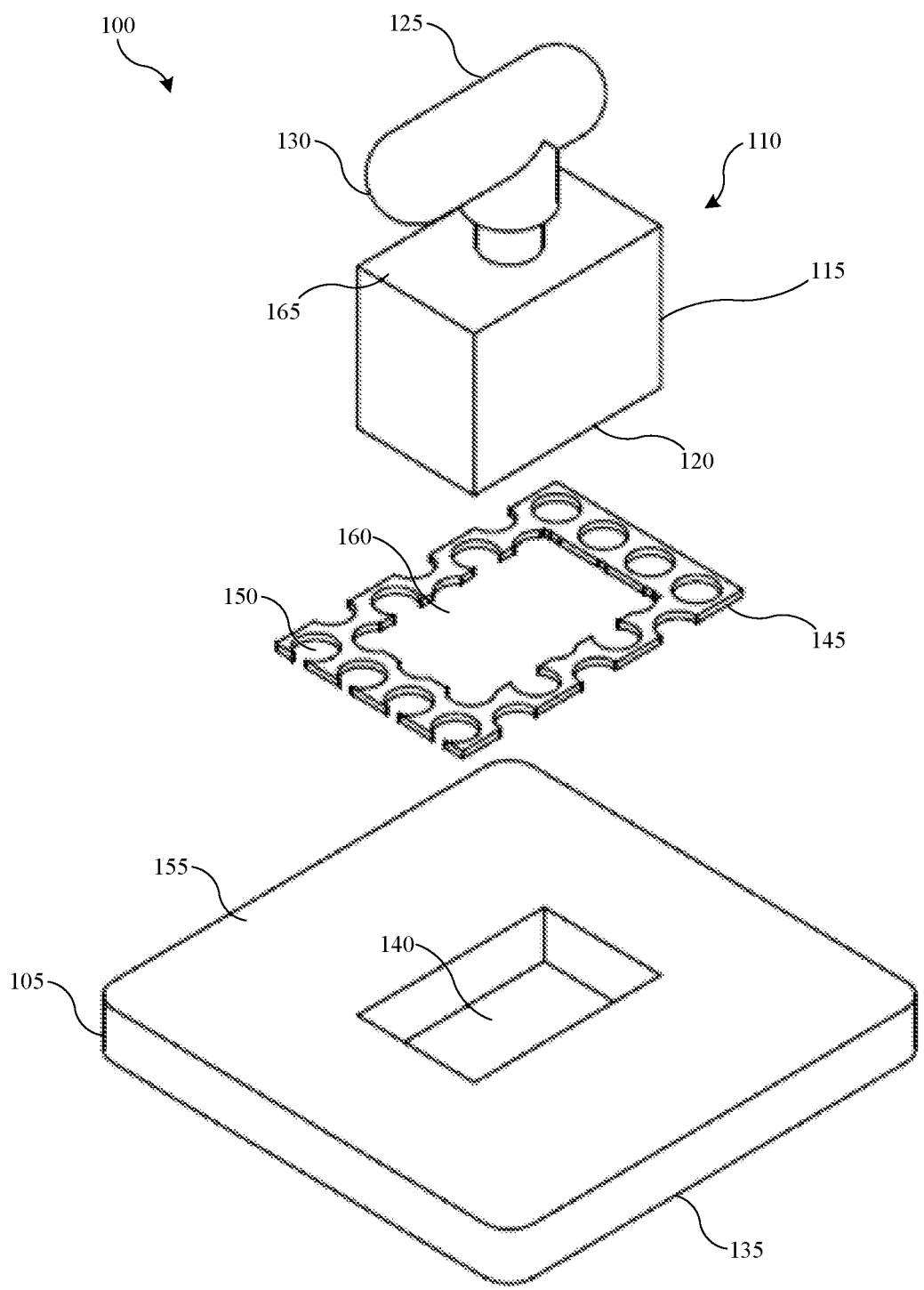
FIG. 5 illustrates an exploded view of the radiation shielding device of FIG. 1.
Figure 6:
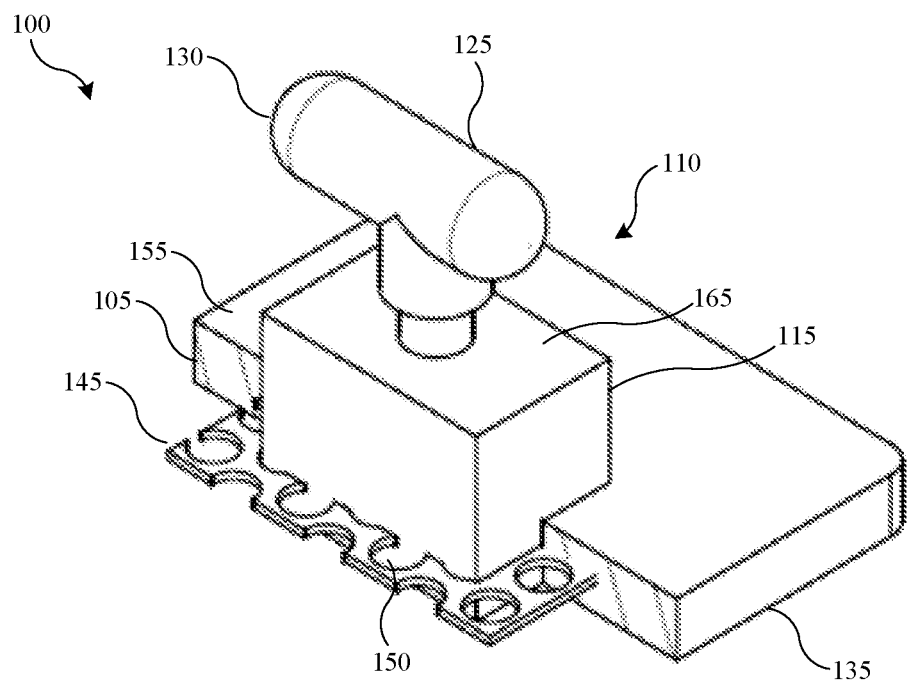
FIG. 6 illustrates a cross-sectional isometric view of the radiation shielding device of FIG. 1.
Figure 7:
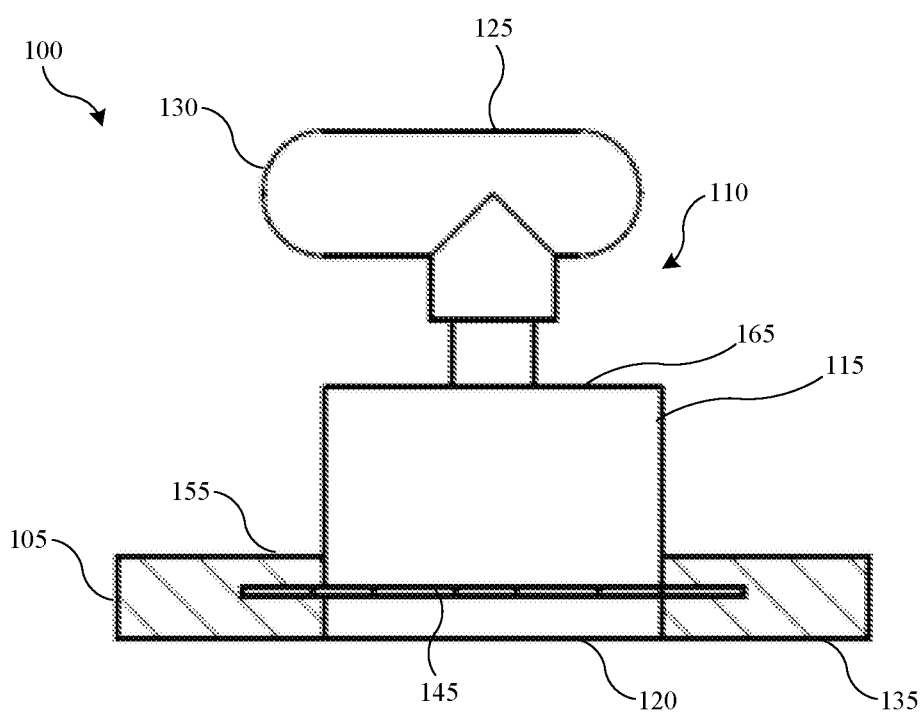
FIG. 7 illustrates a cross-sectional side elevation view of the radiation shielding device of FIG. 1.

As best illustrated in the exploded view of FIG. 5, the radiation shielding material layer 105 may define an aperture 140 that is sized and shaped to receive the body 115 of the switchable magnet device 110. The radiation shielding device 100 may include a perforated sheet 145 that may strengthen an attachment between the radiation shielding material layer 105 and the switchable magnet device 110. The perforated sheet 145 may be embedded within an interior of the radiation shielding material layer 105 during formation of the radiation shielding material layer 105. Perforations 150 of the perforated sheet 145 enable the radiation shielding material layer 105 to flow through the perforations 150 prior to curing and bond to itself to encapsulate the perforated sheet 145 within the radiation shielding material 105 once cured, as shown in FIGS. 6 and 7. Oftentimes, the perforated sheet 145 may be positioned approximately halfway between the bottom surface 135 and a top surface 155 of the radiation shielding material layer 105, although the positioning of the perforated sheet 145 may vary in other embodiments. The perforated sheet 145 may define a central aperture 160 that may be sized and shaped to substantially match the aperture of the 140 of the radiation shielding material layer 105. The switchable magnet device 110 may be inserted within the central aperture 160 and may be coupled with the perforated sheet 145 to secure the switchable magnet device 110 within the radiation shielding material layer 105. In some embodiments, the switchable magnet device 110 may be permanently secured to the perforated sheet 145. For example, the body 115 of the switchable magnet device 110 may be welded, adhered, and/or otherwise permanently fixed with the perforated sheet 145. In other embodiments, the switchable magnet device 100 may be removably secured to the perforated sheet 145. As just one example, the perforated sheet 145 may include one or more threaded receptacles, which may engage with threaded fasteners that are inserted through a portion of the body 115 of the switchable magnet device 110. For example, the body 115 may include a flange, shoulder, or other portion that extends outward beyond the edges of the central aperture 160, with the flange or shoulder defining one or more apertures that are aligned with the receptacles and through which a threaded fastener, such as a bolt or screw, may be inserted. In some embodiments, the threaded receptacle may be formed within a thickness of the perforated sheet 145. In some embodiments the perforated sheet 145 may not be sufficiently thick to support a threaded receptacle that has enough strength to retain a fastener. In such embodiments, a receptacle, such as a nut, may be secured to the perforated sheet 145, such as by welding, to provide an attachment point for the fastener. By removably securing the switchable magnet device 110 to the perforated sheet 145, the switchable magnet device 110 may be removed for service and/or replacement if damaged while allowing the radiation shielding material layer 105 to be reused if undamaged.

The perforated sheet 145 may have length and width dimensions that are greater than the length and width dimensions of the body 115 of the switchable magnet device 110 and that are smaller than the length and width dimension of the radiation shielding material layer 105. In some embodiments, the length and/or width of the perforated sheet 145 may be at least about 150% larger than the corresponding dimensions of the body 115 of the switchable magnet device 110, although smaller perforated sheets 145 may be used in some embodiments. In embodiments with multiple switchable magnet devices 110 on a single radiation shielding device 100, each switchable magnet device 110 may have a dedicated perforated sheet 145, while in other embodiments one or more switchable magnet devices 110 may share a single larger perforated sheet 145. In such embodiments, rather than defining a single central aperture 160, the perforated sheet 145 may define separate apertures that each receive one of the switchable magnet devices 110.

Figure 8:
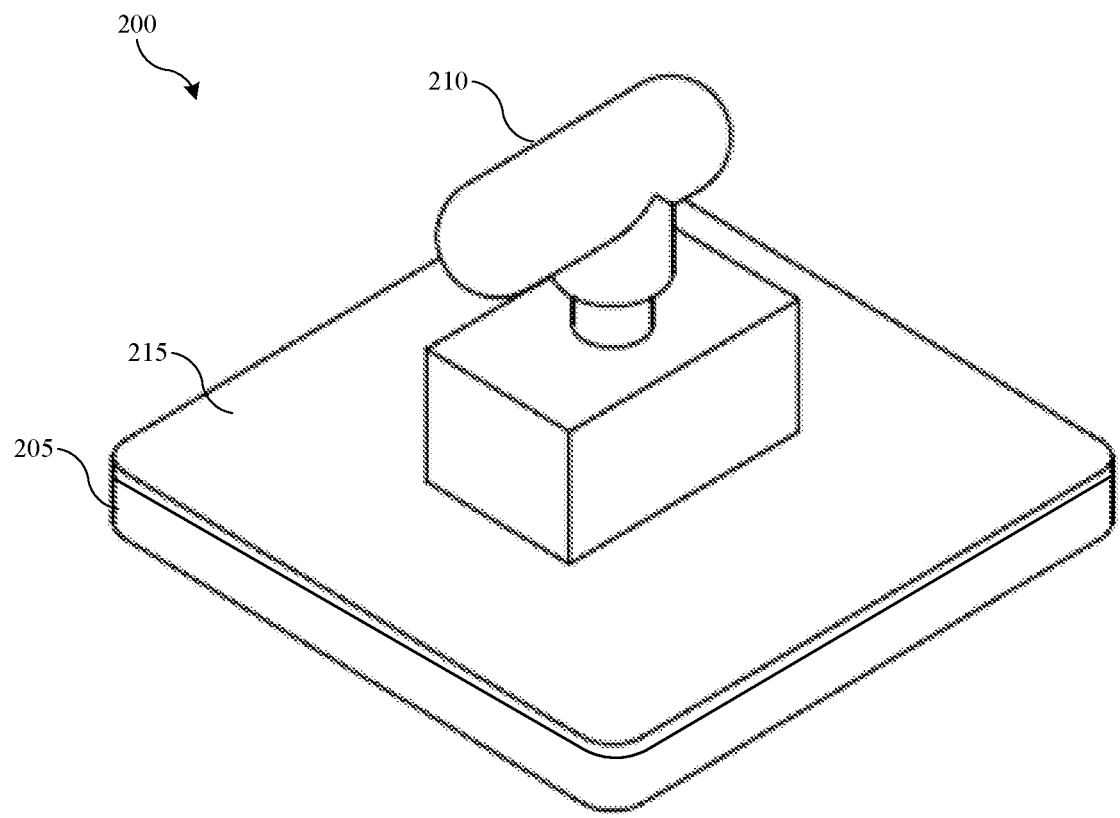
FIG. 8 illustrates an isometric view of a radiation shielding device with a reinforcement layer according to embodiments of the present invention.

In some embodiments, the radiation shielding material layer of a radiation shielding device may have sufficient strength to be mounted without any degradation. In other embodiments, the weight of the radiation shielding material may be too great to be self-supporting when mounted alongside and/or underneath a structure or piece of equipment. In such embodiments, the radiation shielding device may include one or more reinforcement layers. FIG. 8 illustrates one embodiment of a radiation shielding device 200 that includes a reinforcement layer 215. Radiation shielding device 200 may be similar to radiation shielding device 100 described above. For example, the radiation shielding device 200 may include a radiation shielding material layer 205 and one or more switchable magnet devices 210 disposed within the radiation shielding material layer 205. As illustrated, the reinforcement layer 215 may be formed or affixed adjacent to a top surface of the radiation shielding material layer 205. In some embodiments, a reinforcement layer may be incorporated within an interior of the radiation shielding material layer 205 in addition to or in place of the reinforcement layer 215 on the top surface of the radiation shielding material layer 205.

In some embodiments, the reinforcement layer 215 may be formed of a material that is similar to the radiation shielding material layer 205. For example, the reinforcement layer 215 may be formed of a material that includes a similar mixture of one or more elastomers and/or one or more heavy metals as the radiation shielding material layer 205, but without any fillers. The absence of fillers may provide the reinforcement layer 215 with increased strength relative to the radiation shielding material layer 205 and may help the radiation shielding material layer 205 from degrading under its own weight when suspended alongside and/or underneath a piece of equipment or other structure. It will be appreciated that in some embodiments the reinforcement layer 215 may be formed from one or more substances that are not present in the radiation shielding material layer 205. As just one example, the reinforcement layer 215 may be formed from a fabric or mesh sheet.

In some embodiments, the reinforcement layer 215 may include a coloring additive and/or coating that provides the reinforcement layer 215 with a bright color, which may help the presence and positioning of a given radiation shielding device 200 be readily detected. For example, by using a bright color (such as orange, green, yellow, and the like) or other color that contrasts with the equipment or structure being covered, an observer and/or imaging device may be able to quickly detect whether the radiation shielding device 200 is present in a proper position.

In some embodiments, an existing radiation shield, such as a radiation shield blanket, may be retrofit to incorporate switchable magnet device. For example, an existing radiation shield blanket that is being hung from a support using rings or hooks that engage grommet holes formed within the radiation shield blanket may be retrofit to be supported by magnets rather than hooks. FIGS. 9A and 9B illustrate one embodiment of a retrofit radiation shield 300 in accordance with the present invention. Here, a radiation shield 300 may define a number of grommet holes 305 that are usable to hang the radiation shield 300 using rings or hooks. To retrofit the radiation shield 300 for use with switchable magnet devices, a support plate 310, such as a stainless steel plate, may be coupled with at least a portion of the radiation shield 300. For example, bolts, rivets, and/or other fasteners 315 may be inserted and secured within the grommet holes 305 and through corresponding apertures 320 formed within the support plate 310, such as using a nut 325. A mounting bracket 330 may be secured to the support plate 310, such as using fasteners and/or by welding, such that a portion of the mounting bracket 330 extends beyond a peripheral edge of the radiation shield 300. A switchable magnet device 335 may be permanently or removably affixed to the portion of the mounting bracket 330 that extends beyond the peripheral edge of the radiation shield 300 such that a distal end 340 of the switchable magnet device 335 is substantially aligned with or extends beyond a bottom surface 345 of the radiation shield 300. In some embodiments, the support plate 310 and mounting bracket 330 may be combined as a single component. In other embodiments, rather than using the support plate 310 and mounting bracket 330, a retrofit radiation shield 300 may be retrofit by using switchable magnet devices 335 that are sized and shaped to be inserted within the grommet holes 305. The switchable magnet devices 335 may then be inserted and secured within the grommet holes 305 to enable the radiation shield 300 to be secured to a piece of equipment or other structure using switchable magnet devices 335.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Accordingly, the above description should not be taken as limiting the scope of the invention.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

What is claimed is:

1. A radiation shielding device, comprising:
   a radiation shielding material; and
   a switchable magnet device that is at least partially disposed within the radiation shielding material, the switchable magnet device comprising:
   a plurality of permanent magnets; and
   an actuator that adjusts an orientation of at least one of the plurality of permanent magnets to switch the switchable magnet device between an on configuration in which the switchable magnet device produces a net attractive force and an off configuration in which the switchable magnet device produces substantially reduced net magnetic force.

2. The radiation shielding device of claim 1, further comprising:
   a perforated sheet encapsulated within the radiation shielding material and coupled with the switchable magnetic device, wherein the radiation shielding material extends through perforations of the perforated sheet.

3. The radiation shielding device of claim 2, wherein:
   the perforated sheet defines threaded apertures; and
   the switchable magnet device is coupled with the perforated sheet using threaded fasteners that engaged with the threaded apertures.

4. The radiation shielding device of claim 2, wherein:
   one or both of a length of the perforated sheet and a width of the perforated sheet is at least about 150% larger than a corresponding dimension of the switchable magnet device.

5. The radiation shielding device of claim 1, wherein:
   a distal end of the switchable magnet device extends entirely through a thickness of the radiation shielding material.

6. The radiation shielding device of claim 1, further comprising:
   a distal end of the switchable magnet device is covered by a portion of the radiation shielding material.

7. The radiation shielding device of claim 1, further comprising:
   a reinforcement sheet coupled with the radiation shielding material.

8. The radiation shielding device of claim 7, wherein:
   the reinforcement sheet is coupled with a proximal side of the radiation shielding material.

9. The radiation shielding device of claim 1, wherein:
   the actuator comprises a graspable knob that switches the switchable magnet device between the on configuration and the off configuration.

10. The radiation shielding device of claim 1, further comprising:
    the plurality of permanent magnets.

* * * * *